Figure 1:
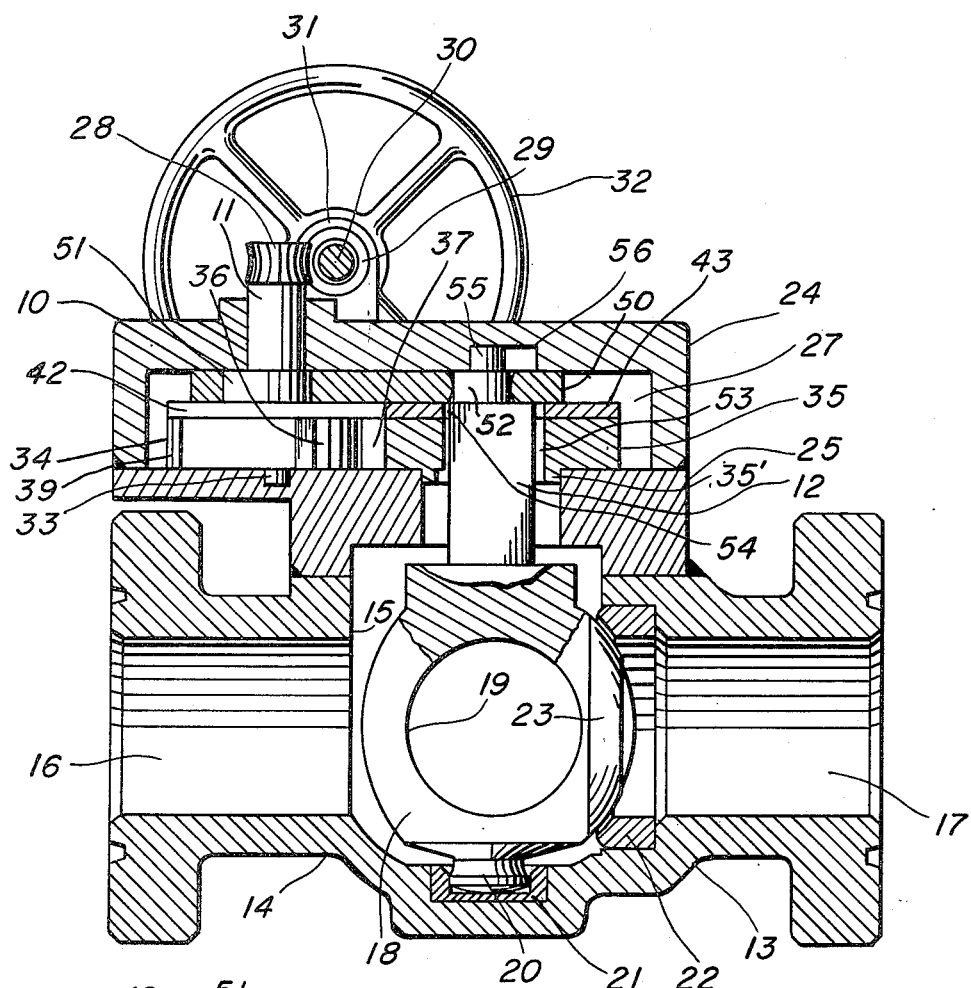

Oct. 5, 1954          D. W. BLEVANS          2,690,894
VALVE OPERATING MECHANISM
Filed March 18, 1950                                    4 Sheets-Sheet 1

Don W. Blevans
INVENTOR.

BY Ahley & Ahley
Attorneys

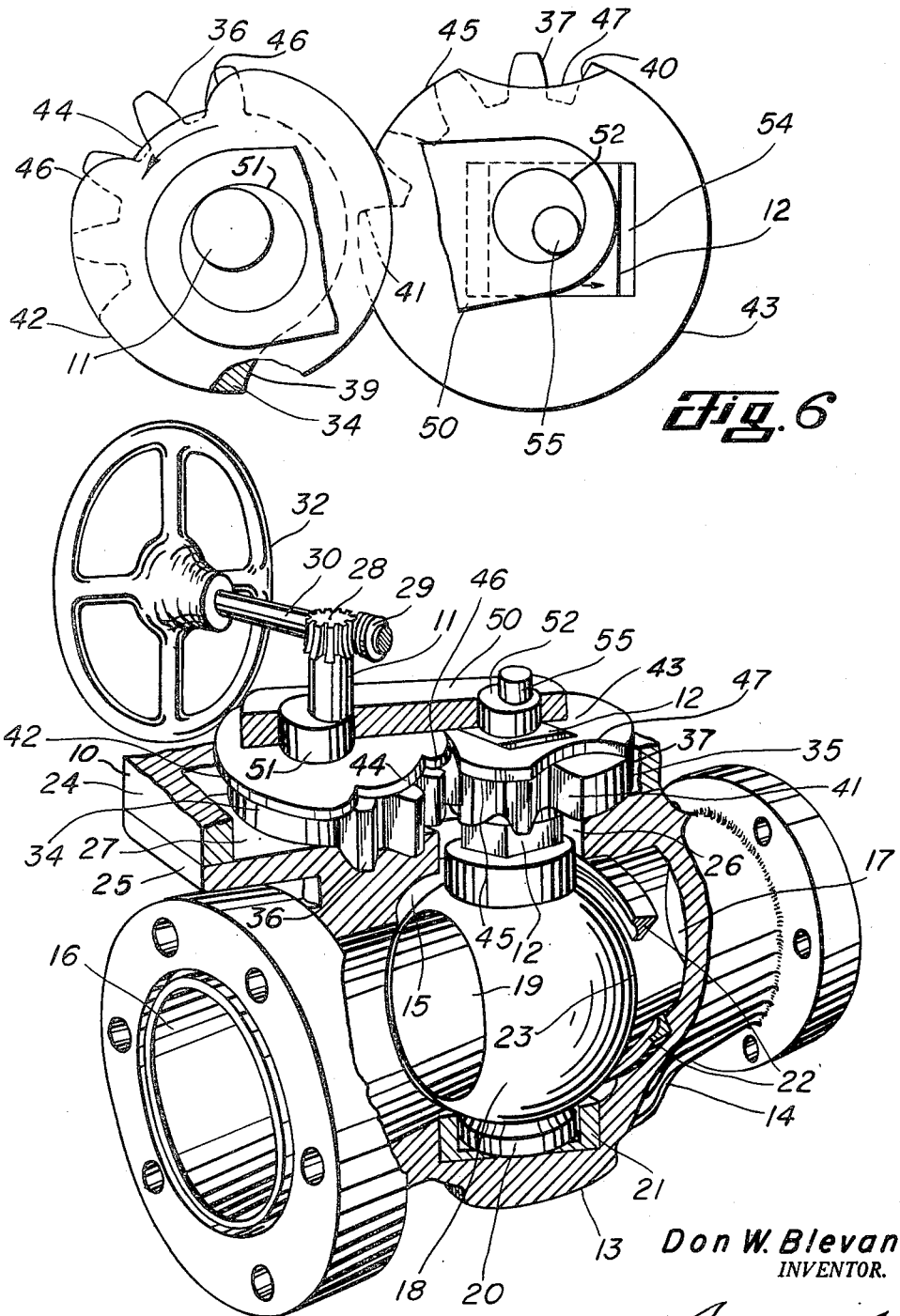

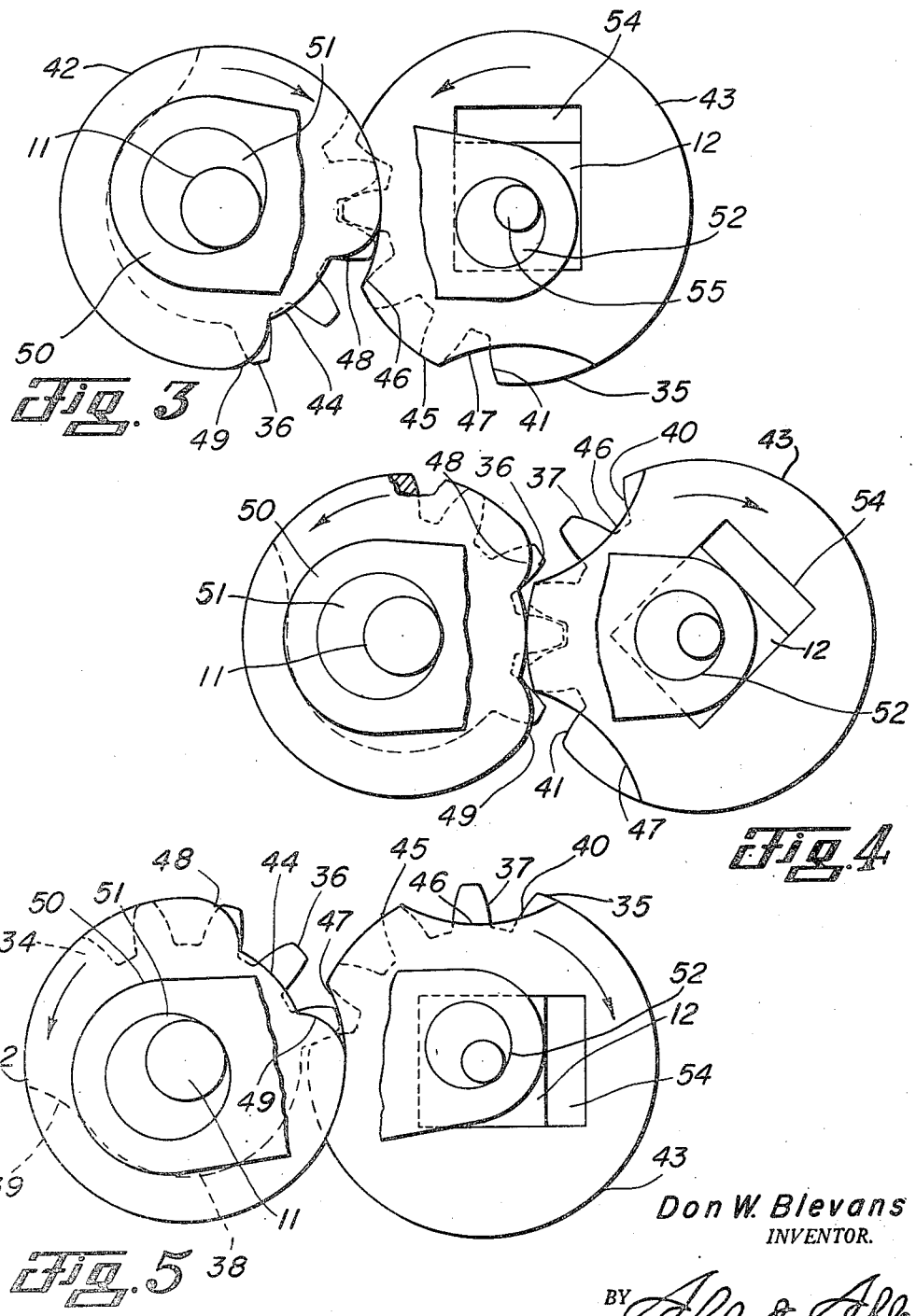

Oct. 5, 1954   D. W. BLEVANS   2,690,894
VALVE OPERATING MECHANISM
Filed March 18, 1950   4 Sheets-Sheet 4
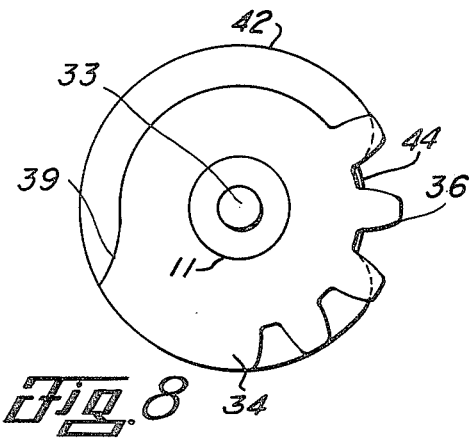
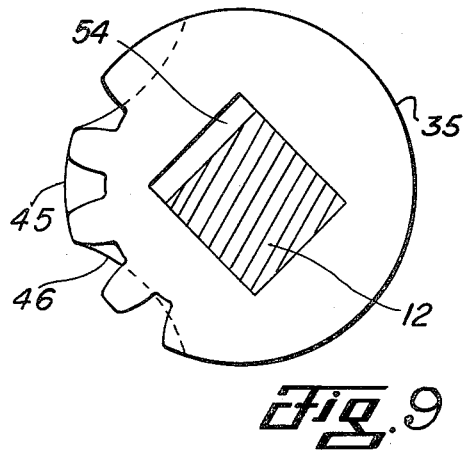
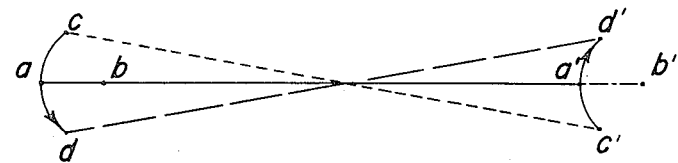
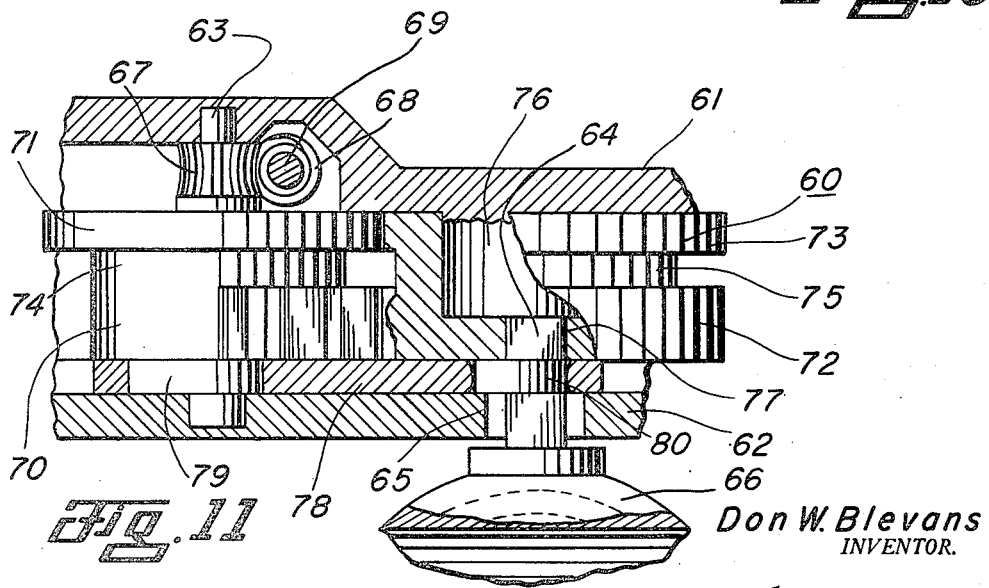
Don W. Blevans
INVENTOR.
BY Ashley & Ashley
Attorneys Patented Oct. 5, 1954

2,690,894

UNITED STATES PATENT OFFICE 2,690,894

VALVE OPERATING MECHANISM

Don W. Blevans, Tulsa, Okla., assignor to Orbit Valve Company, Tulsa, Okla., a corporation of Oklahoma Application March 18, 1950, Serial No. 150,377

17 Claims. (Cl. 251—163)

This invention relates to new and useful improvements in operating mechanisms and more particularly to mechanisms for operating valves.

One object of the invention is to provide an improved operating mechanism for imparting alternate rotative and transverse movements to a member so as to be particularly adapted for use in rotating the core of a plug type valve to open and close the passage of the valve and in shifting said core transversely of its axis of rotation to positively seal said passage.

Another object of the invention is to provide an improved operating mechanism having drive means and driven means which are drivingly connected in such manner as to transmit intermittent rotation from the drive to the driven means, the drive connection being arranged so as to lock said driven means against rotary movement and permit relative rotation of said drive means.

A particular object of the invention is to provide an improved operating mechanism, of the character described, wherein the drive and driven means have eccentric connection independent of the drive connection for moving said driven means transversely of its axis of rotation upon relative rotation of said drive means.

An important object of the invention is to provide an improved operating mechanism, of the character described, wherein the drive connection includes coacting drive elements and a modified Geneva movement for imparting intermittent rotation to said driven means and locking the same against rotary movement to permit relative rotation of said drive means.

A further object of the invention is to provide an improved operating mechanism, of the character described, wherein the drive elements are so arranged as to assure intermittent rotation of the driven means and locking of said means against rotation in cooperation with the modified Geneva movement, the drive means being arranged to turn through a greater angle of rotation than said driven means for preventing binding due to the eccentric connection.

Still another object of the invention is to provide an improved operating mechanism, of the character described, which includes a drive member and a driven member having drive connection through intermittently meshing gear teeth or cogs and modified Geneva wheels, the latter having coacting interlocking surfaces for cooperating with the gear teeth to transmit intermittent rotation to the driven member and lock said member against rotation.

A still further object of the invention is to provide an improved operating mechanism, of the character described, which is of primary use in high pressure valves due to the positive sequence of operation obtained by the coaction of its elements.

A construction designed to carry out the invention will be hereinafter described together with other features of the invention.

Figure 7:
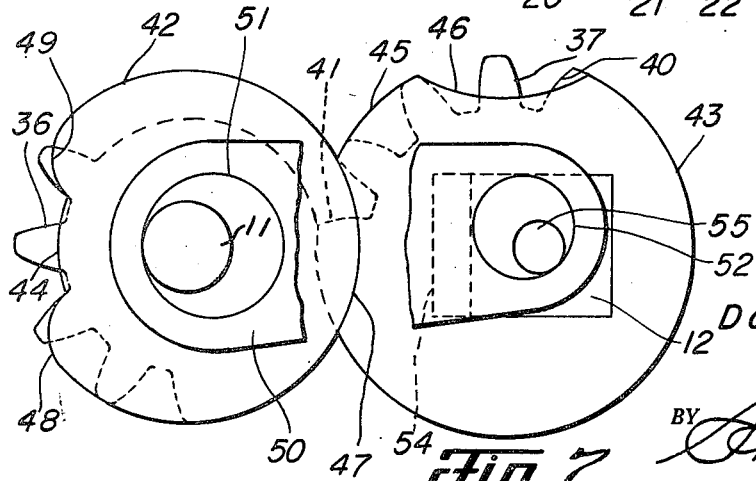

The invention will be more readily understood from a reading of the following specification and by reference to the accompanying drawings, wherein examples of the invention are shown, and wherein:

Fig. 1 is a transverse, vertical, sectional view of an operating mechanism embodying the features of the invention and shown applied to a valve having a rotatable, transversely movable core, Fig. 2 is a perspective view of the mechanism and valve, partly in section, and showing the valve core in its open position, Fig. 3 is a plan view of the operating mechanism in the position shown in Fig. 2, Fig. 4 is a view, similar to Fig. 3, showing the mechanism turned 45° to an intermediate position, Fig. 5 is a plan view showing the mechanism turned 90° from the position shown in Figs. 2 and 3 to the closing position of the core shown in Fig. 1, Fig. 6 is a view, similar to Fig. 5, showing the drive member turned approximately 80° relative to the driven member and the transverse movement of the latter for shifting or tilting the valve core to its seated position, Fig. 7 is a view, similar to Figs. 5 and 6, showing the maximum rotation of the drive member and maximum transverse movement of the driven member, Figs. 8 and 9 are underside views of the drive and driven members, Fig. 10 is a diagrammatic view illustrating the relative positions and movements of the cams of the drive and driven members, and Fig. 11 is a transverse, vertical, sectional view of a modified form of operating mechanism applied to the valve.

In the drawings, the numeral 10 designates an operating mechanism which includes a drive member or shaft 11 and a substantially parallel driven member or stem 12. The mechanism is particularly adapted for use in valves of the plug-type which are employed to control the flow of fluids under high pressure. A valve of this type is designated by the numeral 13 and includes a housing or body 14 having an upright, substantially cylindrical chamber 15 and axially-alined, lateral inlet and outlet passages 16 and 17, respectively, communicating with the chamber. A valve element or core 18, having a diametric port 19 of a diameter substantially equal to the diameter of the inlet and outlet passages 16 and 17, is rotatably mounted in the chamber 15 by a pivot pin or trunnion 20 depending axially from the core and movably confined in a socket or recessed bearing plate 21 countersunk in the bottom of said chamber. Thus, the core is free to rotate about its vertical axis and to rock transversely. The core 18 is of general spherical shape and is connected to the stem 12 so as to be turned to open and closing positions by moving its port 19 into and out of registration with the inlet and outlet passages.

An annular, bevelled valve seat 22 is mounted in the inner end of the outlet passage and is adapted to be engaged by a complementary valve face 23 formed on the exterior of the spherical core at substantially a right angle to its port 19. In the open position shown in Fig. 2, the port of the core is in registration with the inlet and outlet passages for permitting flow through the valve. Upon turning of the core 90° in a counterclockwise direction, the port is moved out of registration with said passages and the valve face 23 is moved into axial alinement with the valve seat 22 (Fig. 1). Due to the pivotal mounting of the core, the same is adapted to be shifted or tilted transversely of its axis of rotation toward the outlet passage so as to cause the valve face to sealingly engage the complementary valve seat.

The operating mechanism 10 is provided for imparting such rotative and transverse movements to the valve core through the valve stem 12. As is most clearly shown in Fig. 1, the operating mechanism includes a suitable housing 24 having a bottom plate 25 overlying and welded or otherwise secured to the valve body so as to close the upper end of its chamber 15. An opening 26 is formed in the plate 25 for accommodating the upwardly projecting stem which is preferably square in cross-section. The housing 24 is supported by the plate 25, being welded or otherwise secured thereto, and has a chamber 27 for receiving the major portion of the mechanism. A suitable pinion 28 is mounted on the upper end of the drive shaft 11 for meshing with a worm 29 carried by a transverse shaft 30 which is journaled in a bearing block 31 for rotation by a hand wheel 32. The shaft 11 is journaled in the housing so as to extend through the chamber 27 in substantially parallel relation to the stem. An axial pin or arbor 33 depends from the shaft and is journaled in the plate 25 for rotatably supporting said shaft.

For transmitting rotation from the shaft to the stem, a drive disk or gear wheel 34 is fixed on said shaft and is adapted to mesh intermittently with a driven disk or gear wheel 35 carried by said stem (Figs. 8 and 9). The disks 34 and 35 have coacting drive elements 36 and 37, respectively, in the form of cogs or gear teeth which preferably have bevelled faces or flanks. A depending hub 35' is formed on the disk 35 and is rotatably confined in the opening 26 to prevent lateral or transverse movement of said disk. Since only partial rotation is desired, only a few teeth are necessary and the desired rotation may be obtained by providing four teeth 36 for coacting with three teeth 37. The remainders of the disks 34 and 35 are circular, the periphery of said disk 34 being relieved at 38 to provide an abutment or shoulder 39 for engaging the periphery of said disk 35 upon full counter-clockwise rotation as shown in Fig. 7. Bevelled shoulders or abutments 40 and 41 are formed at the ends of the teeth 37 for engagement with the endmost teeth 36 as shown in Figs. 3 and 5 so as to assist clockwise and counter-clockwise rotation of the disk 35 by the disk 34. It is noted that the pitch diameter of the teeth 36 is less than the pitch diameter of the teeth 37 to permit the shaft and its disk 34 to rotate through a greater angle than the stem and its disk 35 during the engagement of said teeth.

A modified Geneva movement is provided for coacting with the drive and driven disk and includes a pair of substantially circular plates or wheels 42 and 43 carried by and rotatable with the shaft 11 and stem 12, respectively. The plate 42 has an arcuate recess 44 in its periphery for coacting with a tongue or finger 45 formed on the plate 43 by arcuately recessing the latter plate at 46 and 47. The plates have the same external diameter as their respective disks and may be made integral therewith. The recesses 46 and 47 conform to the periphery of the plate 42 and preferably are swung on the same radius. The ends of these recesses adjacent the tongue 45 coincide with the bevelled faces or flanks of the teeth 37. The bottom of the recess 44 and the end of the tongue 45 are shaped convexly to provide clearance, while the ends of said recess are suitably radiused or relieved as shown by the numerals 48 and 49 for clearing the recesses 46 and 47, respectively. As shown in Fig. 2, the recess 46 is moved into binding engagement with the periphery of the plate 42 by the teeth to limit counter-clockwise rotation of the plate 43 and the stem. Since the teeth are moved out of engagement upon counter-clockwise rotation of the shaft, the recess 47 permits relative rotation of the plate 42 with said shaft and serves to lock the plate 43 and the stem against rotation in either direction until the teeth are re-engaged. Thus, the recesses 46 and 47 serve as interlocks and coact with the teeth.

For imparting transverse movement to the stem, an element or link 50 has eccentric pivotal connection with the shaft and said stem by means of cams or pins 51 and 52 eccentrically mounted upon and rotatably with said shaft and stem, respectively. Due to the eccentric mounting of the cams 51 and 52 and their rotation in opposite directions, said cams tend to move toward and away from each other when the shaft and stem are rotated. In Figs. 3 and 5, the cams are directed at approximately 90° relative to each other and must be swung through arcs of approximately 45° in order to be alined or occupy the same relative position (Fig. 4). The centerline distance between the cams would be decreased upon rotation of said cams from the position shown in Fig. 3 to the position shown in Fig. 4 and increased upon rotation from the Fig. 4 position to the Fig. 5 position. In order to maintain the centerline distance between the cams within limits sufficient to prevent binding of said cams with the link 50, the radial movement of the cam 51 is increased due to the greater angle of rotation of the shaft. As an example, the pitch diameter of the teeth 36 may be sufficiently less than the pitch diameter of the teeth 37 to permit the shaft and its cam to rotate 48° plus while rotating the stem and its cam 52 approximately 45°.

The relative positions and movements of the cams are illustrated diagrammatically in Fig. 10, wherein the letters $a$ and $a'$ represent the centers of said cams and the letters $b$ and $b'$ the centers of the shaft and the stem about which said cams rotate. Thus, the line $aa'$ represents the center line distance between the cams when the same are in the intermediate position shown in Fig. 4. The open valve position of the cam centers shown in Fig. 3 is represented by the letters $c$ and $c'$, while the letters $d$ and $d'$ represent the valve closing position of said cam centers (Fig. 5). The cam centers move away from each other when swung through the arcs $ac$, $a'c'$ or the arcs $ad$ and $a'd'$ or toward and then away from each other in moving through the complete arcs $cd$ and $c'd'$. Therefore the distance between the centers represented by the broken lines $cc'$ and $dd'$ would be greater than the line $aa'$ and would result in binding if the arc $cd$ were not greater than the arc $c'd'$.

Elongate openings or slots 53 and 54 are formed in the disk 35 and plate 43, respectively, at a right angle to the port 19 of the valve core 18 to assure fixed directional transverse movement of said core. For preventing transverse movement of the stem prior to its rotation to the position shown in Figs. 1 and 5, a reduced cylindrical pin 55 is formed on the upper end of said stem and is rotatably confined within an elongate recess or groove 56 formed in the housing 24 in alinement with the passages 16 and 17 of the valve. Thus, there can be no transverse movement of the stem until the slots 53 and 54 of the disk 35 and the plate 43 are alined with the recess 56.

The port 19 of the valve core 18 is alined with the passages 16 and 17 of the valve body to permit flow therethrough when the operating mechanism is in the position shown in Figs. 2 and 3. Due to the coaction of the recess or interlock 46 with the plate 42 and the meshing of the gear teeth 36 and 37, the stem 12 is held against counter-clockwise rotation. In order to turn the stem in a clockwise direction and rotate the valve core to its closed position, the hand wheel 32 is turned clockwise so as to rotate the shaft 11 counter-clockwise. The elements of the operating mechanism move to the position shown in Fig. 4 and then to the position shown in Figs. 1 and 5 upon this rotation.

In the latter position, the recess or interlock 47 is in contact with the periphery of the plate 42 and the teeth have moved out of mesh, the clockwise tooth 36 being in a position to move away from the shoulder 41. Continued counter-clockwise rotation of the shaft is relative to the stem and the elements carried thereby, whereby the eccentrically connected link 50 causes shifting or transverse movement of said stem. The cams 51 and 52 are directed at an angle of approximately 90° relative to each other and this angle constantly diminishes due to the movement of said cam 51 toward said cam 52. Upon rotation of the shaft approximately 80° from the position shown in Fig. 5 to the position shown in Fig. 6, the stem is moved transversely a distance sufficient to shift or tilt the valve core and move the valve face 23 into sealing engagement with the valve seat 22. An additional counterclockwise rotation of the shaft is possible in order to compensate for wear of the valve seat and face. Although this additional rotation is subject to variation, the same has been shown as being approximately 55° in Fig. 7.

Since it requires 90° to rotate the valve core from its open to its closed position, approximately 80° to seat the valve face and 55° is provided for additional wear, it is possible to rotate the shaft a total of 225°. The engagement of the shoulder 39 with the periphery of the disk 35 limits counter-clockwise rotation of the shaft. When it is desired to open the valve, the shaft and its elements are moved from the position shown in Fig. 6 or Fig. 7 to the position shown in Figs. 1 and 5. This relative rotation of the shaft disengages the valve face from the valve seat and moves the clockwise tooth 36 into engagement with the shoulder 41. Continued clockwise rotation of the shaft turns the stem in a counter-clockwise direction due to the meshing of the teeth until the interlock 46 contacts the periphery of the plate 42 as shown in Figs. 2 and 3. In this position, the port of the valve core is again alined with the passages of the valve body to permit flow therethrough.

In Fig. 11, a modified form of operating mechanism 60 is shown and includes a housing 61 having a flat bottom plate 62 similar to the housing 24 and its bottom plate 25. An upright drive member or shaft 63 is journaled in the housing 61 for coacting with a driven member or stem 64 mounted in the housing in substantially parallel relation. The stem 64 is substantially square in cross-section and has its lower end projecting through a guide opening 65 in the plate 62 and connected to a valve core 66 which is similar to the valve core 18. A pinion 67 is mounted on the upper portion of the shaft 63 and meshes with a worm 68 carried by a transverse shaft 69 for imparting rotation to said shaft. This rotation is transmitted to the stem by a gear wheel or disk 70 and a modified Geneva wheel or plate 71 carried by the shaft and coacting with a gear wheel or disk 72 and a modified Geneva wheel or plate 73 associated with said stem. The disks 70 and 72 are substantially identical to the disks 34 and 35, while the plates 71 and 73 are substantially identical to the plates 42 and 43.

Although the disks and plates coact in the same manner, the disks 70 and 72 are preferably made integral with the plates 71 and 73, respectively, and are connected in spaced relation by reduced collar portions 74 and 75. A cylindrical boss 76 depends from the top of the housing 61 for rotatably confining the disk 72 and plate 73 in coacting relationship to the disk 70 and plate 71. The disk 72 is provided with an elongate opening or slot 77, extending at a right angle to the port of the valve core 66, to permit shifting or transverse movement of the stem. A link 78, similar to the link 50, is disposed below the disks and is eccentrically connected to the shaft and stem by cams or pins 79 and 80 mounted eccentrically upon and rotatable with said shaft and stem. The cams 79 and 80 are substantially identical to the cams 51 and 52 and occupy the same relative positions for imparting shifting or transverse movement to the stem upon rotation of the valve core 66 to its closed position. This modification illustrates that the particular arrangement of the elements of the operating mechanism is not critical. However, it is desirable to make the disks and plates integral and to dispose the link and cams more closely adjacent the valve core or other member which is to be moved or tilted transversely of its axis of rotation.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An operating mechanism for a valve core rotatably mounted and movable transversely in a valve body having an inlet and an outlet and a valve stem connected to the valve core including, rotatable drive means spaced transversely from the valve stem, means drivingly and rotatably connecting the drive means to the stem and intermittently engaged for imparting intermittent rotation to the latter and disengaged to permit rotation of said drive means relative to the stem, and a link extending transversely between and having eccentric connection with said drive means and stem independently of the connecting means and being moved transversely of the axis of rotation of said drive means by relative rotation of the latter for shifting the stem transversely of its axis of rotation to move the valve core transversely.

2. An operating mechanism for a valve core rotatably mounted and movable transversely in a valve body having an inlet and an outlet including, a rotatable drive member, a driven member connected to the valve core and spaced transversely from the drive member, a rotatable driving connection between the members intermittently engaged for transmitting intermittent rotation to the driven member and disengaged to permit rotation of the drive member relative to the driven member, and means extending transveresly between and having eccentric connection with said members independently of the driving connection and being moved transversely of the axis of rotation of said drive member by relative rotation of the latter for shifting said driven member transversely of its axis of rotation to move the valve core transversely.

3. An operating mechanism for a valve core rotatably mounted and movable transversely in a valve body having an inlet and an outlet including, a rotatable drive member, a driven member having connection with the valve core and spaced transversely from the drive member, an intermittent rotatable drive connection between the members intermittently engaged for transmitting rotary movement from the drive member to said driven member to rotate the valve core and disengaged to permit rotation of said drive member relative to said driven member, and a link extending transversely between and having eccentric connection with said members independently of the drive connection and being moved transversely of the axis of rotation of said drive member by relative rotation of the latter for shifting said driven member transversely of its axis of rotation to move the valve core.

4. In a valve, an operating mechanism including, a rotatable drive member, a driven member rotatable and movable transversely of its axis of rotation and having intermittent rotatable drive connection with the drive member intermittently engaged so as to permit synchronous rotation of the members and disengaged to permit relative rotation of said drive member, said members being spaced transversely of each other, and means extending transversely between and having eccentric connection with said members independently of the drive connection and being moved transversely of the axis of rotation of said drive member by relative rotation of the latter for shifting the driven member transversely of its axis of rotation.

5. In a valve, an operating mechanism including, a rotatable drive member, a driven member rotatable and movable transversely of its axis of rotation and having intermittent rotatable drive connection with the drive member intermittently engaged so as to permit synchronous rotation of the members and disengaged to permit relative rotation of said drive member, said members being spaced transversely of each other, and a link extending transversely between and having eccentric pivotal connection with said members independently of the drive connection and being moved transversely of the axis of rotation of said drive member by relative rotation of the latter for moving the driven member transversely of its axis of rotation.

6. An operating mechanism as set forth in claim 5 including, cogs carried by the drive and driven members and meshing intermittently for transmitting rotation from the drive member to the driven member.

7. An operating mechanism as set forth in claim 5 including, cogs carried by the drive and driven members and meshing intermittently for transmitting rotation from the drive member to the driven member, and modified Geneva wheels mounted on said drive and driven members and coacting with the cogs to lock said driven member against rotation.

8. An operating mechanism as set forth in claim 5 including, teeth carried by the drive and driven members and meshing intermittently for transmitting rotation from the drive member to the driven member, the pitch diameter of the drive teeth being less than the pitch diameter of the driven teeth to permit turning of said drive member through a greater angle of rotation and prevent binding due to the eccentric connection of the link.

9. In a valve having inlet and outlet openings in its body, a chamber communicating with the openings, a valve seat adjacent one of said openings, a valve core journaled in the chamber for sequential and alternate rotative and transverse movements therein to control flow through said openings, the valve core having a passage adapted to be alined with said openings in the open position of said core and a valve face movable into and out of engagement with the valve seat in the closed position of said core; an operating mechanism including, a rotatable drive shaft, a rotatable valve stem for actuating the valve core, gear teeth carried by the shaft and stem and meshing intermittently for transmitting rotation from said shaft to said stem so as to turn said core to open and closed positions, said shaft being rotatable relative to said stem when the gear teeth are out of mesh, modified Geneva wheels mounted on said shaft and stem for coacting with said gear teeth to lock said stem and core against rotation when in open and closed positions, eccentric pivot pins carried by said shaft and stem, and a transverse link connecting the pivot pins, whereby said stem and core are moved transversely of their axis of rotation to move the valve face into and out of engagement with the valve seat upon relative rotation of said shaft.

10. An operating mechanism as set forth in claim 9 wherein the gear teeth of the drive shaft have a lesser pitch diameter than the gear teeth of the valve stem to permit rotation of said shaft and its pivot pin through an angle greater than the angle of rotation of said stem and its pivot pin during meshing of said gear teeth, whereby the centerline distance between the pins is substantially maintained to prevent binding of said pins with their connecting link.

11. In a valve, an operating mechanism including a rotatable drive member, a driven member rotatable and movable transversely of its axis of rotation, teeth on the members adapted to mesh intermittently for transmitting rotation from the drive member to the driven member and moving out of mesh to permit relative rotation of said drive member, eccentric cams on said members and rotatable therewith, and a link pivotally connecting the cams for moving said driven member and its cam transversely of its axis of rotation upon relative rotation of said drive member and its cam, the drive teeth having a lesser pitch diameter than the driven teeth to permit rotation of said drive member and its cam through an angle greater than the angle of rotation of said driven member and its cam during meshing of said teeth, whereby the distance between said cams is maintained to prevent binding of said cams with the link.

12. In a valve, an operating mechanism including, a rotatable drive member, a driven member rotatable and movable transversely of its axis of rotation, drive elements on the members adapted to mesh intermittently for transmitting rotation from the drive member to the driven member and moving out of mesh to permit relative rotation of said drive member, cam means mounted on each member eccentrically of its axis of rotation, the members and their cam means being disposed in transversely spaced relation, and an element extending transversely between and pivotally connecting the cam means so as to be movable transversely of said drive member for moving said driven member and its cam means transversely of its axis of rotation upon relative rotation of the drive member and its cam means.

13. An operating mechanism for a valve core rotatably mounted and movable transversely in a valve body having an inlet and an outlet including, a rotatable drive member, a driven member connected to the valve core, a rotatable driving connection between the members intermittently engaged for transmitting intermittent rotation to the driven member and disengaged to permit rotation of the drive member relative to the driven member, and means having eccentric connection with said members and movable transversely of the axis of rotation of said drive member upon relative rotation of the latter for shifting said driven member transversely of its axis of rotation to move the valve core transversely, the drive connection including modified Geneva wheels mounted on the members for locking said driven member against rotation.

14. An operating mechanism for a valve core rotatably mounted and movable transversely in a valve body having an inlet and an outlet including, a rotatable drive member, a driven member connected to the valve core, a rotatable driving connection between the members intermittently engaged for transmitting intermittent rotation to the driven member and disengaged to permit rotation of the drive member relative to the driven member, and means having eccentric connection with said members and movable transversely of the axis of rotation of said drive member upon relative rotation of the latter for shifting said driven member transversely of its axis of rotation to move the valve core transversely, the drive connection including teeth carried by the members and meshing intermittently for transmitting rotation from said drive member to said driven member.

15. An operating mechanism for a valve core rotatably mounted and movable transversely in a valve body having an inlet and an outlet including, a rotatable drive member, a driven member connected to the valve core, a rotatable driving connection between the members intermittently engaged for transmitting intermittent rotation to the driven member and disengaged to permit rotation of the drive member relative to the driven member, and means having eccentric connection with said members and movable transversely of the axis of rotation of said drive member upon relative rotation of the latter for shifting said driven member transversely of its axis of rotation to move the valve core transversely, the drive connection including coacting drive elements mounted on the members and meshing intermittently for transmitting rotation from said drive member to said driven member, and modified Geneva wheels mounted on said members for coacting with the drive elements to lock said driven member against rotation.

16. In a valve, an operating mechanism including, a rotatable drive member, a driven member rotatable and movable transversely of its axis of rotation and having intermittent rotatable drive connection with the drive member intermittently engaged so as to permit synchronous rotation of the members and disengaged to permit relative rotation of said drive member, and means having eccentric connection with said members independently of the drive connection and movable transversely of the axis of rotation of said drive member upon relative rotation of the latter for shifting the driven member transversely of its axis of rotation, the drive connection including gear teeth carried by the drive and driven members and meshing intermittently for transmitting rotation from said drive member to said driven member.

17. In a valve, an operating mechanism including, a rotatable drive member, a driven member rotatable and movable transversely of its axis of rotation and having intermittent rotatable drive connection with the drive member intermittently engaged so as to permit synchronous rotation of the members and disengaged to permit relative rotation of said drive member, and means having eccentric connection with said members independently of the drive connection and movable transversely of the axis of rotation of said drive member upon relative rotation of the latter for shifting the driven member transversely of its axis of rotation, the drive connection including coacting drive elements mounted on the members and meshing intermittently for transmitting rotation from said drive member to said driven member, and modified Geneva wheels mounted on said members for coacting with the drive elements to lock said driven member against rotation.

References Cited in the file of this patent

UNITED STATES PATENTS

| Number | Name | Date |
| --- | --- | --- |
| 1,979,490 | Wilson | Mar. 24, 1931 |
| 1,989,009 | Heggem | Jan. 22, 1935 |
| 2,076,841 | Heggem | Apr. 13, 1937 |